United States Patent [19]

Morikawa

[11] Patent Number: 5,467,169
[45] Date of Patent: Nov. 14, 1995

[54] IMAGE FORMING APPARATUS WHICH CAN PREVENT COPYING DURING A PREDETERMINED PERIOD AND ALLOW COPYING AT OTHER TIMES

[75] Inventor: Takeshi Morikawa, Toyokawa, Japan

[73] Assignee: Minolta Camera Kabushiki Kaisha, Osaka, Japan

[21] Appl. No.: 267,870

[22] Filed: Jun. 28, 1994

[30] Foreign Application Priority Data

Jul. 1, 1993 [JP] Japan .................... 5-163508

[51] Int. Cl.⁶ ........................................ G03G 21/00
[52] U.S. Cl. ................. 355/201; 283/72; 283/901; 283/902; 356/71
[58] Field of Search ................... 355/133, 201; 356/71; 283/72–74, 94, 901, 902

[56] References Cited

U.S. PATENT DOCUMENTS

| | | | |
|---|---|---|---|
| 4,739,377 | 4/1988 | Allen | 355/133 |
| 4,882,604 | 11/1989 | Kato et al. | 355/201 |
| 5,216,724 | 6/1993 | Suzuki et al. | 355/201 X |
| 5,257,119 | 10/1993 | Funada et al. | 283/901 X |
| 5,321,470 | 6/1994 | Hasuo et al. | 355/201 |

FOREIGN PATENT DOCUMENTS

| | | | |
|---|---|---|---|
| 58-219568 | 12/1983 | Japan | 355/201 |
| 4-9963 | 1/1992 | Japan . | |

*Primary Examiner*—William J. Royer
*Attorney, Agent, or Firm*—Willian Brinks Hofer Gilson & Lione

[57] ABSTRACT

A copy allowable time can be set for a document, and can be embedded in a hard copy of the document as discrete signals which cannot be recognized with the naked eye. A digital copying machine allows the document to be copied in a copy operation during the copy allowable time and, at other times, either prohibits copying or changes the copy operation.

11 Claims, 21 Drawing Sheets

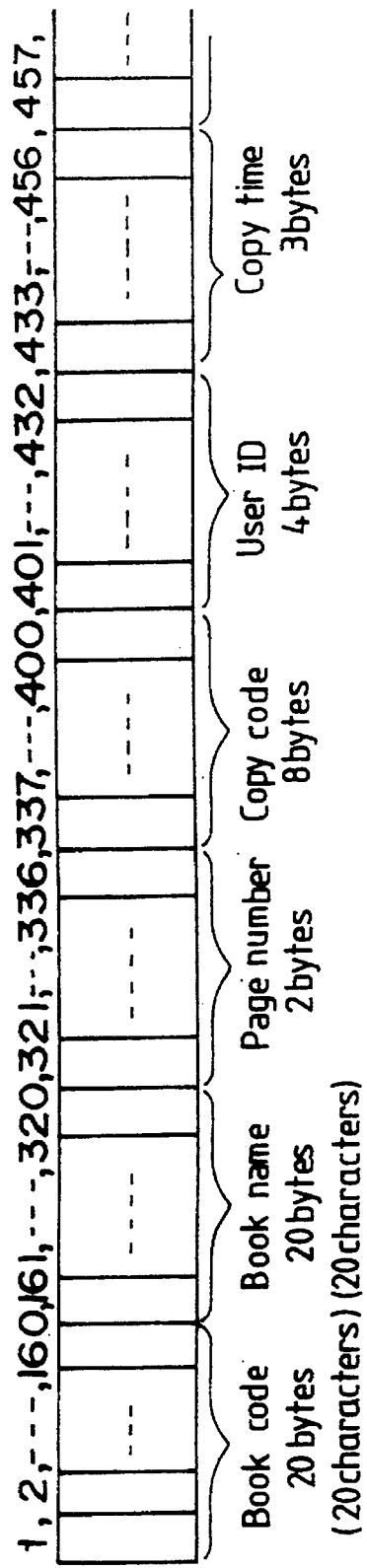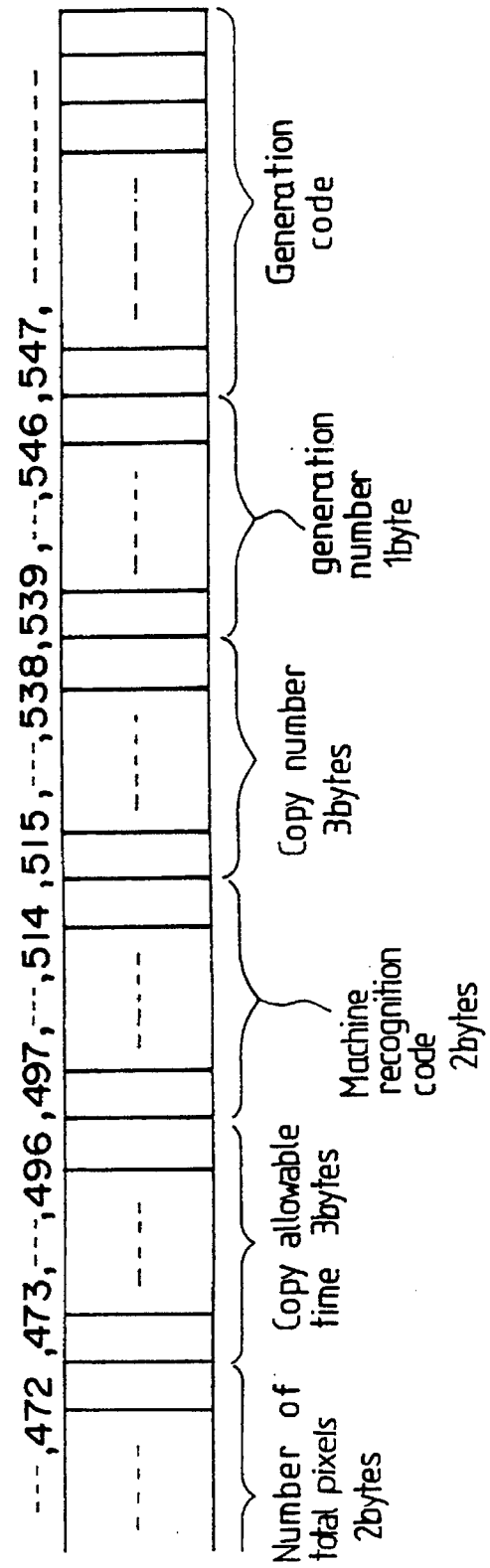
Fig. 2

Fig. 7
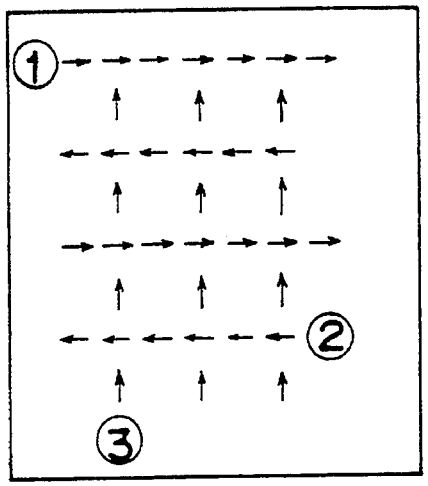
→ Path of embedding of 1st set
← Path of embedding of 2nd set
↑ Path of embedding of 3nd set
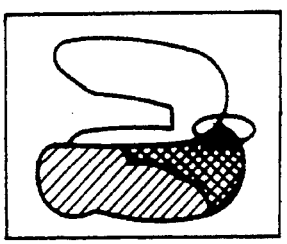
Fig. 8(a)
Fig. 8(b)

IMAGE FORMING APPARATUS WHICH CAN PREVENT COPYING DURING A PREDETERMINED PERIOD AND ALLOW COPYING AT OTHER TIMES

BACKGROUND OF THE INVENTION

1. Field of the Invention

The present invention relates to an image forming apparatus such as a printer or a copying machine for producing a copy and a management system therefor which can prevent illegal copying.

2. Description of the Prior Art

Recently, copying machines and printers are developed and used widely. Then, infringement of copyrights and illegal copies of secret documents become problems to be solved. There have been proposed many apparatuses and methods in order to prevent the leakage of secret documents by copying. In an apparatus, a prescribed additional code is added or embedded in a hard copy of a document when the document is regenerated. The additional code comprises digital or discrete dots which have sizes hard to be recognized with naked eyes. When the hard copy is regenerated again, the additional data is read and if the hard copy is decided to be related to a secret document, regeneration of the hard copy is for example prohibited.

However, in many cases, a document does not become secret after a predetermined time has passed. Therefore, it is preferable that the document is allowed to be regenerated in such a system which prevent illegal regeneration by using additional data formed on a hard copy.

SUMMARY OF THE INVENTION

An object of the present invention is to provide an image forming apparatus which can prevent an illegal copy effectively in a predetermined period but allows a copying operation except during the predetermined period.

In an image forming apparatus of the present invention, if a document to be regenerated is a hard copy of a document, time data may be included in the document as digital or discrete data. When the document or hard copy is generated again, the digital image data thereof is read and the time data is recognized from the image data. On the other hand, a current time is provided by a clock. A controller compares the time derived from the recognized time data with the current time provided by the clock. Then, an image forming operation is controlled according to a result of the comparison. The time data may be for example a copy allowable time or a copy prohibition period. Then, it is possible to prohibit generation of the document until a copy allowable time or in a specified period.

An advantage of the present invention is that an image forming apparatus cannot generate an image of a document automatically when the document is decided to be secret.

BRIEF DESCRIPTION OF THE DRAWINGS

These and other objects and features of the present invention will become clear from the following description taken in conjunction with the preferred embodiments thereof with reference to the accompanying drawings, and in which:

FIG. 2 is a diagram of an example of binarized data of additional data to be embedded in a hard copy;

FIG. 7 is a diagram illustrating a procedure for embedding block data of the additional data in a hard copy by using density blocks;

FIG. 8 is a diagram of an example of an image of a document consisting of various densities wherein additional data is embedded;

DETAILED DESCRIPTION OF THE PREFERRED EMBODIMENTS

Figure 1:
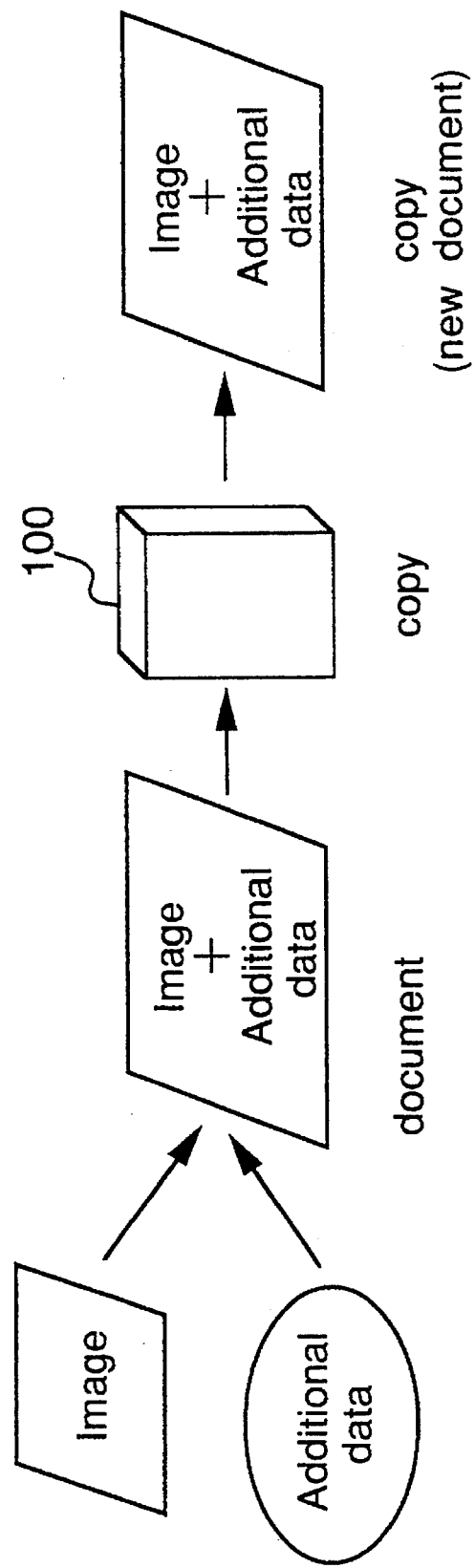
FIG. 1 is a block diagram of a hard copy management system.

Referring now to the drawings, wherein like reference characters designate like or corresponding parts throughout the views, embodiments of the present invention will be explained below in the following order:

(1) General outline of additional code (2) Binarization and embedding of additional data (3) Detailed explanation of digital copying machine 3-1 Outline of the blocks in the copying machine 3-2 Image reader 3-3 Image decision and recovery sections 3-4 Operation unit 3-5 Additional data management section 3-6 Secret management section 3-7 Main controller (1) General outline of additional code FIG. 1 shows an outline of a flow of generation of a hard copy in a digital copying machine 100 in the embodiment. As shown in FIG. 1, it is needed to add a time data to a digital document image. Then, a digital additional data which cannot be recognized by an ordinary user with naked eyes is embedded in the document image for secret management in a hard copy by the copying machine 100. The additional data is embedded in an image of the document as discrete dots or digital data in the present embodiment, but it may also be added to a margin of the hard copy.

When a digital copying machine 100 reads a document image of such a document to which the additional data is added, it extracts a time data from read digital time. Then, it compares the time data with the current time and controls copy operation according to the comparison. In concrete, it compares a time included as "copy allowable time" in the additional data with the current time. If the current time has passed the copy allowable time, copying operation of the copying machine 100 is allowed, otherwise copying operation is forbidden. Thus, a document which has to be kept in secrecy remains secret until the copy allowable time is prevented to be reproduced illegally.

The copying machine 100 embeds additional data in an output image on a paper when an image read from a document is reproduced. Thus, it can produce a document with additional data newly. Further, by updating the additional data for each copy, it can check the history of the hard copy or the leakage path from the original document to the hard copy.

(2) Binarization and embedding of additional data

Table 1 shows additional data to be embedded in an image. The additional data comprises, besides the copy allowable time, a document name, a book code, a page number, a generation code, a copy code, a total pixel number, a user ID (identification) number, a copy time, and a copy number and a machine recognition code. By embedding such additional data useful for copy management in a hard copy, a leakage path of a document brought out illegally can be confirmed and traced.

TABLE 1

| Kind of additional data | Content of additional data |
| --- | --- |
| document name | book name or the like |
| book code | code number intrinsic for each document |
| page number | page number in a document |
| generation code | generation number of copying |
| copy sequence number | number of sequence from original document |
| copy allowable time | time when copying is allowed |
| total pixel number | |
| user ID number | code number to identify a user |
| copy time | time when copy is generated |
| copy number | number of copies reproduced simultaneously |
| machine recognition code | a code to identify a machine |

In Table 1, the book code is an intrinsic code registered for each book in order to identify a book. The page number denotes a page number of a page of a book to be copied. The generation code is a number used to represent the generation number from the original source, and it increases by one for each generation. The copy sequence number denotes a sequential number of copies produced from an original source, irrespective of generation code. The copy allowable time is a time from which a copying of a document is allowed. The total pixel number denotes a number of pixels read from a document except that of additional data. The user ID number is a number to identify a user. The copying time is a date of copying. The copy number denotes a number of copies regenerated simultaneously. The machine recognition code is 10 a code intrinsic for each digital copying machine, and it makes it possible to identify a copying machine among those of the same model.

The copying machine 100 binarizes the additional data shown in Table 1 and embeds binarized additional data at a plurality of print portions in a hard copy. However, the embedding of additional data may be performed not by the copying machine 100, but by an embedding unit provided only for the embedding processing.

Additional data may be added to a margin of the hard copy as discrete dots or digital data. In such a case, the additional data may be recognized with pattern matching.

A method of the binarization is explained next in detail. However, a binarization method is not limited to the method.

Most of the data in additional data can be defined with a specific length. For example, the book code and the book name can be expressed sufficiently with a data length of 20 digits (20 bytes), and 20 bytes are assigned to the book code and the book name. Similarly, 2 bytes, 8 bytes, 4 bytes, 3 bytes, 2 bytes, 3 bytes, 2 bytes, and 1 byte are assigned to page number, copy code, user ID number, copy time, total pixel number, copy allowable time, machine recognition code, copy number, and the number of generations expressed in a generation code, respectively. Among the data shown in Table 1, only the generation code is a variable-length data and a data of 2 bytes times the number of generations. That is, the data length of the generation code is increased with the number of generations so as to avoid the assignment of unnecessary data length.

Additional data is expressed as continuous data with the above-mentioned data lengths as shown in FIG. 2. Preferably, additional data can be embedded in each hard copy in at least two positions. Further, the order of each data in the additional data is determined beforehand, and if relevant data is not available, a temporary data of "0"'s or the like is substituted in the additional data.

The additional data has to be embedded by the copying machine 100 in a modest way so that an ordinary man cannot recognize it. However, there may be a case wherein it is hard to embed additional data in a hard copy in a modest way because the data length of the additional data shown in FIG. 2 is long. In order to overcome this situation, additional data can be divided into blocks of a predetermined data length for embedding it in the unit of block in a hard copy. A block number is added to each block in order to identify the position in the additional data. If it is difficult to embed even a block, the order of superiority in the blocks are determined beforehand, and blocks of inferior order are omitted to be embedded. In order to recover additional data from a hard copy, data of each block with block number are read and the data is rearranged in the order of block number to restore the original additional data. The data of blocks impossible to be read are deleted in the recovered additional data.

Figure 3:
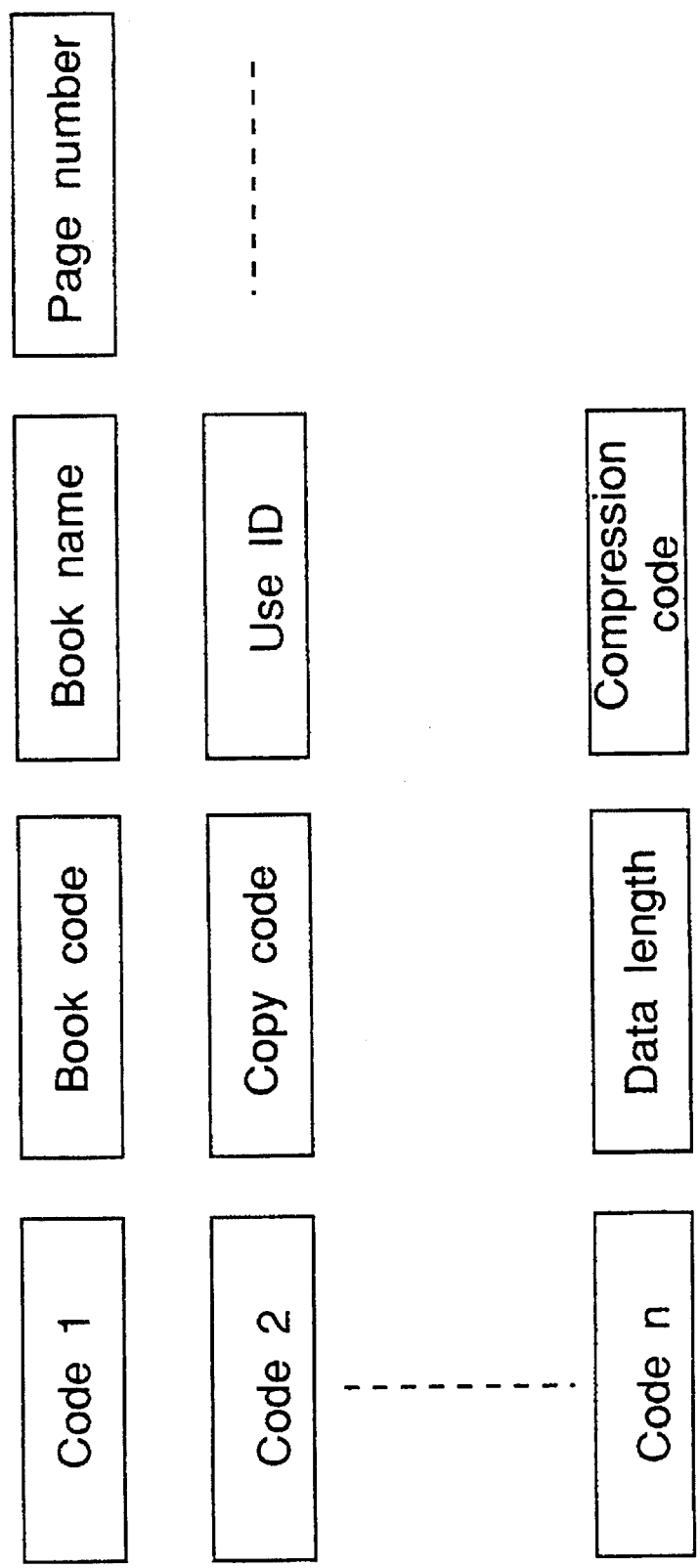
FIG. 3 is a diagram of an example of the binarized data divided into data of variable length.

Further, the block data may be generated in a different way. For example, as shown in FIG. 3, the data length of the blocks may be variable and a code may be added at the top of the blocks in order to recognize the format. In FIG. 3, the compression code means a code data compressed with a predetermined compression algorithm. In this method, it is needed to determine the compression algorithm of the compression code and the like beforehand.

Figure 4:
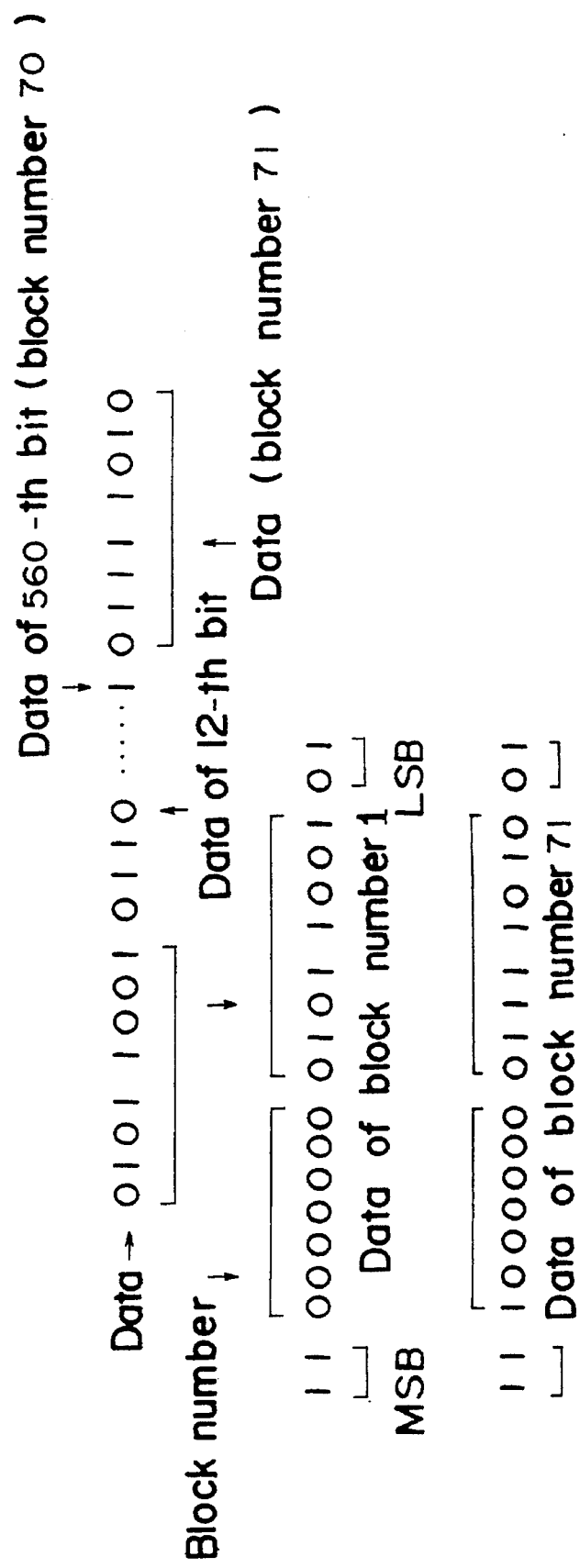
FIG. 4 is a diagram of an example of block data of block number "1" and "71" when binarized data of an additional data is divided into 8-bit data.

In this embodiment, additional data shown in FIG. 2 is divided in the unit of 8 bytes. FIG. 4 shows examples of block data of the first and 71-th blocks in this case. A block number is expressed as 7-bit data, and a block data of 15 total bits is defined with MSB of "11" and LSB of "01". In order to read each block data embedded in a hard copy, data is decided as an embedded block data if there are pixels of a predetermined number between MSB of "11" and LSB of "01".

Figure 5:
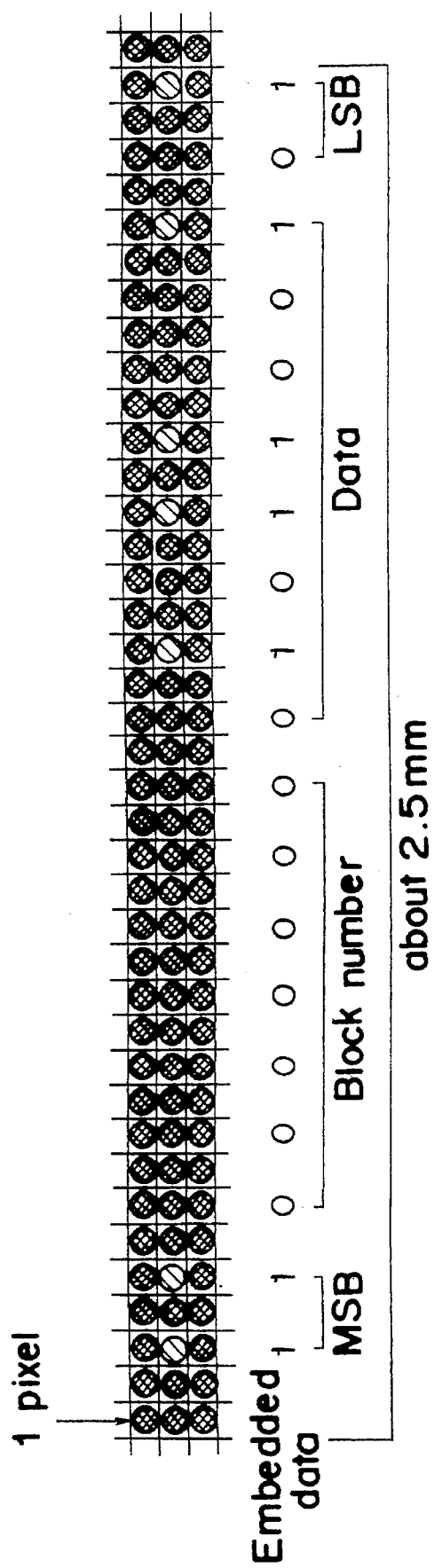
FIG. 5 is a diagram of an example of density data of block data of block number "1" embedded in an image.

FIG. 5 shows a situation of embedding block data "01011001" of the first block (block number="0") shown in FIG. 4 in an image. When block data is embedded in an image, one level (say "0") of a binarized data is expressed at a density which is the same as those of adjacent pixels, while the other level ("1") is expressed at a density which is different a little from those of adjacent pixels. This data is hereinafter referred to as "density data". Further, in the example shown in FIG. 5, each density data in a block is arranged with a distance of one pixel as discrete data. Block data consists of 19 total bits (=2+7+8+2), and it can be embedded if there is a line of a length more than 40 dots, as shown as a central horizontal dot line in FIG. 5. The 40 dots has a length of 1/10 inch (about 2.5 mm) for a printer or an image reader of a resolution of 400 dots per inch, and black lines of such a length may exist in most documents including characters. That is, additional data of 40 dots can be embedded sufficiently in such a document.

Figures 6A, 6B, 6C, 6D:
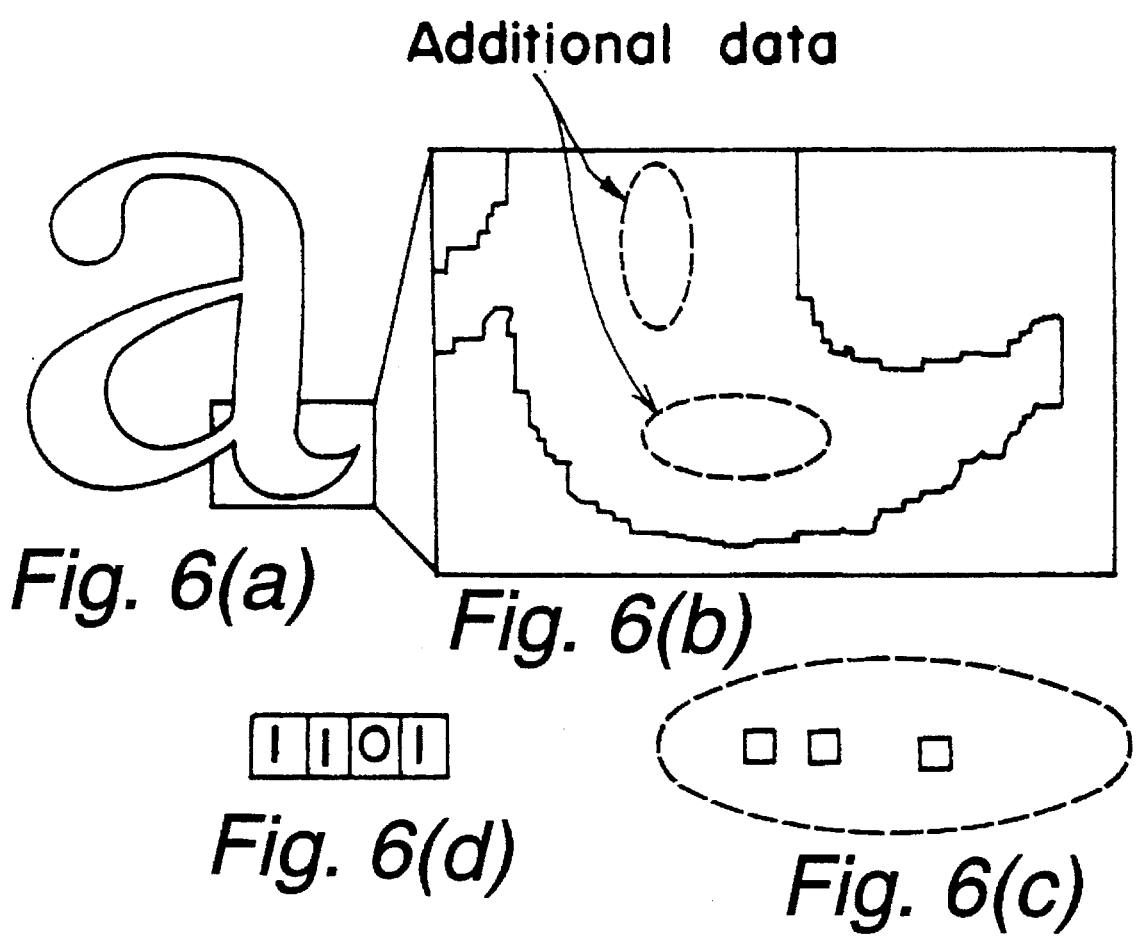
FIG. 6 is a diagram of an image of a character "a" embedding a block data.

Next, the data conversion into density data and the embedding of additional data of blocks in an image in a hard copy is explained. FIG. 6 illustrates an example of the data conversion and the embedding schematically. In FIG. 6, (a) denotes an enlarged view of a small character "a" of a font of 12 point, while (b) denotes an enlarged view of a part of the character "a" of (a). In this example, additional data ("1101") is embedded at positions as shown in (c) encircled with ovals. The density data shown in (c) is obtained by converting the data ("1101") shown in (d), and they are embedded at a constant pitch (pixel distance).

Block data of additional data can be embedded in an image at an arbitrary position irrespective of position and direction of density data, and each dot of an additional data is so small not to be recognized with naked eyes. Because the embedding position of an additional data is not definite, it becomes impossible for a user who wants to leak secret documents to copy them by shading the additional data embedded in a hard copy.

However, if block data is embedded in a certain area, they become prominent as noises. Because additional data is desirable not to be recognized by an ordinary user, it is dispersed throughout a hard copy. As an example shown in FIG. 7, additional data is formed along three directions, successively from a corner. Further, in order to minimize the possibility of the absence of density data for a dirty document or for a document prepared as a patchwork, it is desirable to embed a plurality of sets of the same additional data repeatedly in a hard copy as shown in FIG. 7. There may be a case wherein a part of additional data is recovered erroneously due to dirtiness or the like. In this case, an odd number of sets of additional data is embedded in a hard copy, and effective data is determined from a decision by majority.

For a document wherein the density of an image changes complicatedly, it becomes hard for additional data to be recognized from an image. Therefore, additional data is embedded at an area wherein the density changes little. However, additional data can also be embedded over a plurality of areas if there is no density change in each of the areas for example in two areas as shown in FIG. 8, or if there are areas not having a density assigned for the additional data.

Figure 9B:
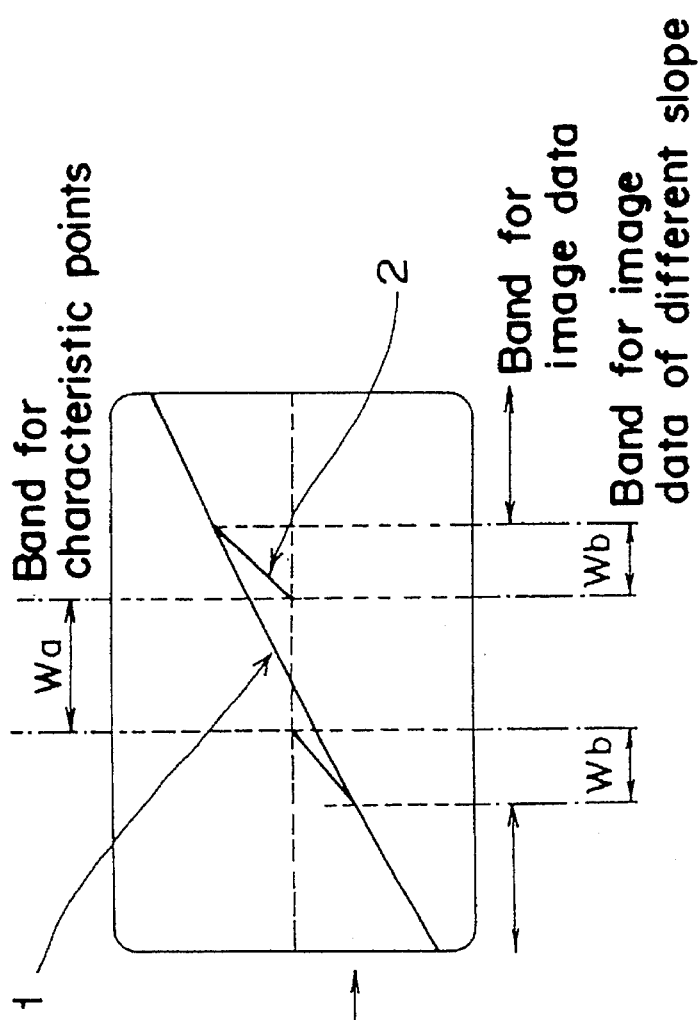
FIG. 9B is an enlarged diagram of FIG. 9A.
Figure 9A:
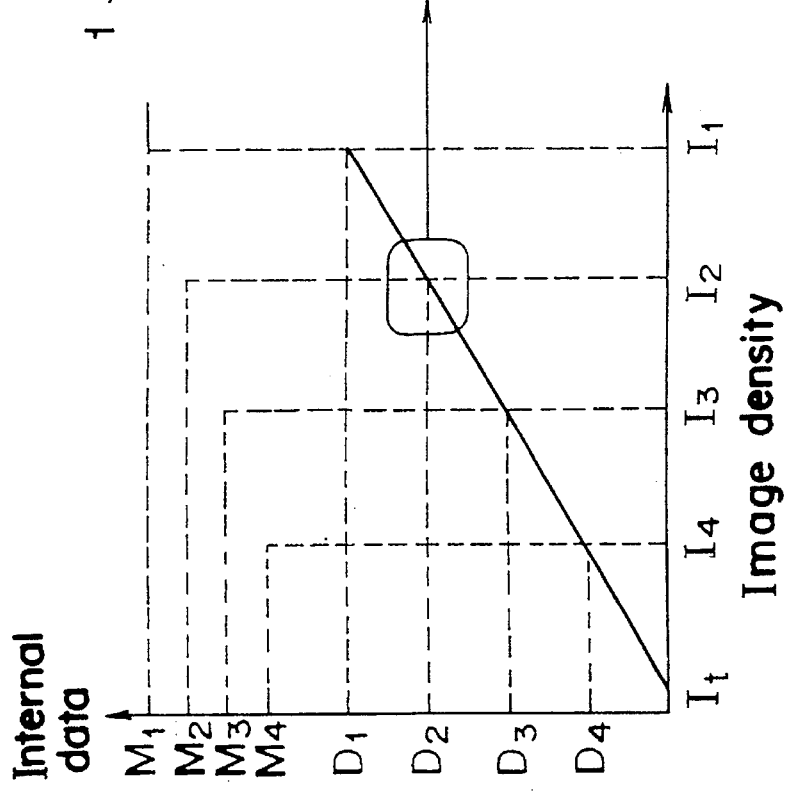
FIG. 9A is a diagram for changing the density of a document image when the density of the document image changes continuously.

In principle, a predetermined density band is assigned for density data generated from block data in order to embed additional data. However, as shown in FIG. 9A, for a half-tone image wherein the density changes continuously, the density values are changed for a density band "Wa" assigned to density data of block data, as shown enlarged in FIG. 9B. That is, in density bands "Wb" at both sides of the density band "Wa", the slope "1" of reproduced density with the image density is changed as slopes "2", or the image density of document in the density band "Wa" is driven out from the band "Wa".

Figure 10:
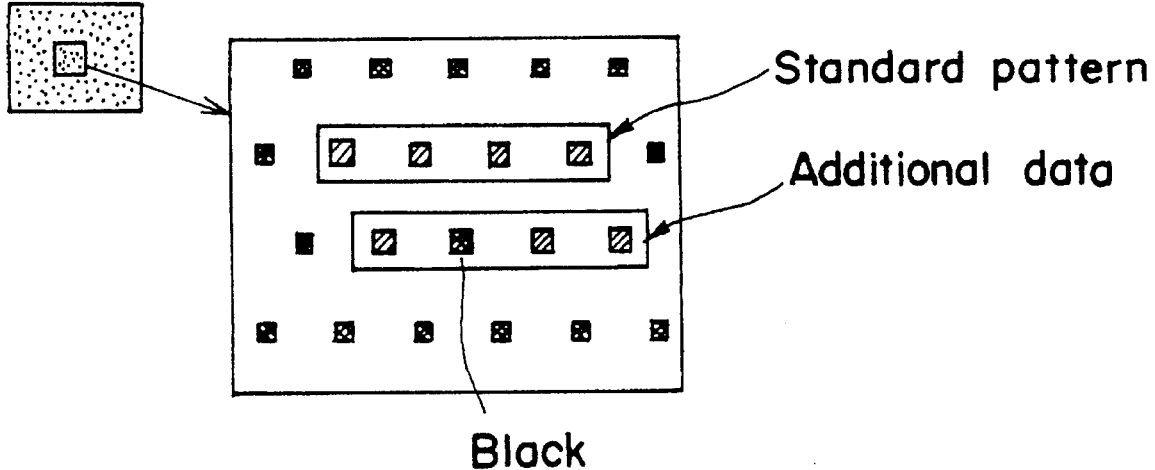
FIG. 10 is a diagram of an example of a process of embedding additional data for a document image wherein a long data cannot be embedded continuously.

A long continuous density data cannot be embedded in some figures such as a pattern of parallel narrow lines or the like. In FIG. 10, density data can be embedded even in such a case by using each pattern itself as density data to express additional data. Further, as shown in FIG. 10, a standard pattern may be embedded in parallel to the additional data (four dots in this example) without using density data for MSB and LSB, and additional data as long as the standard pattern can be embedded. In this method, though the width is enlarged, the length can be shortened.

By performing the above-mentioned procedure, additional data is embedded in a document image, and a hard copy embedded with the additional data can be printed. Then, by reading the additional data embedded in the hard copy, it can be decided if the hard copy is related to a secret document or when the document was copied, which apparatus was used to copy the document, how many copies of the document were made and so on. Then, the leakage of a secret document can be traced up to the leakage source.

(3) Detailed explanation of digital copying machine

The structure and the function of the copying machine 100 is explained below in detail.

3-1 Outline of the blocks in the copying machine

Figure 11:
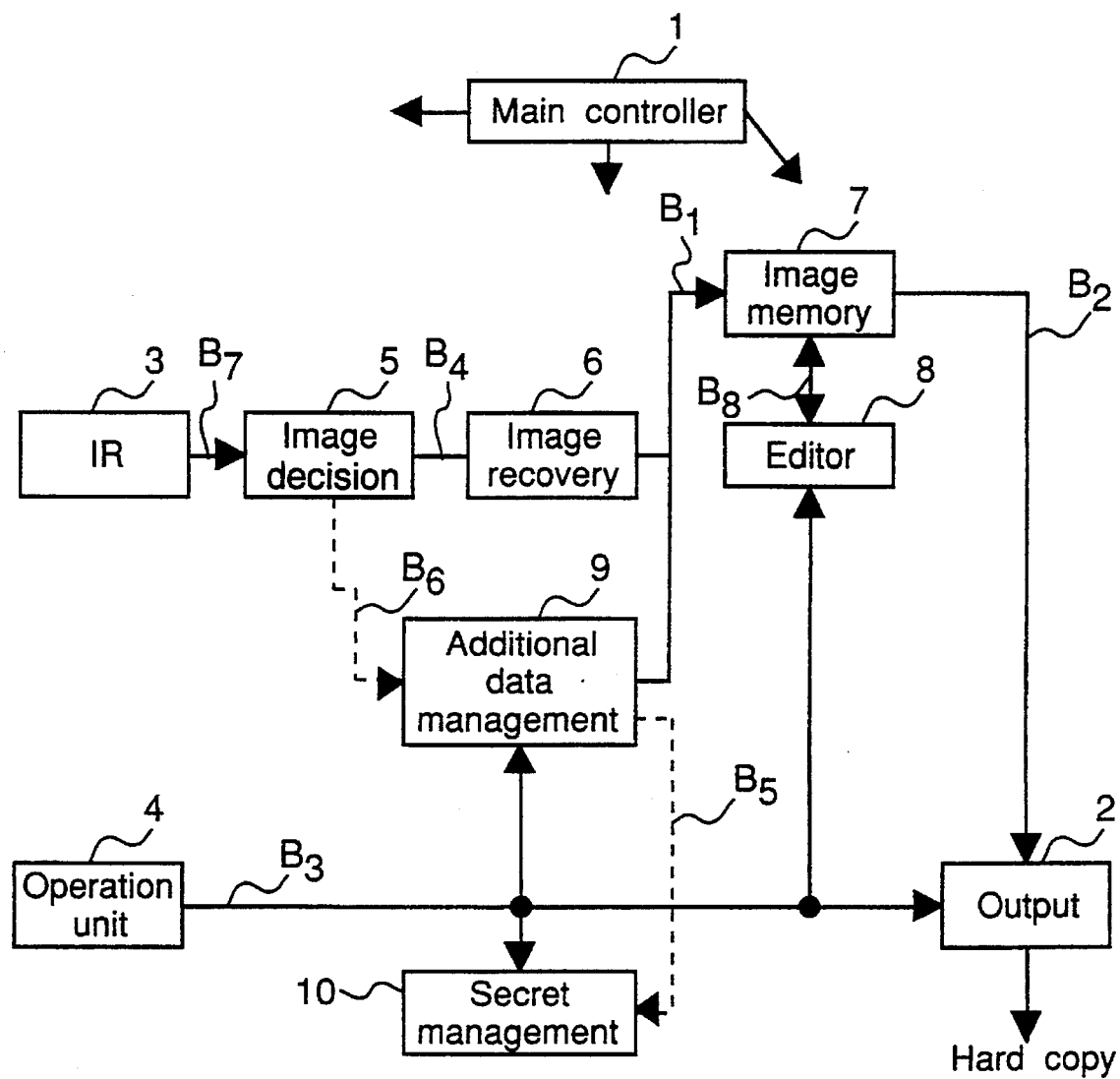
FIG. 11 is a block diagram of a controller of a copying machine which also illustrates a main flow of data.

FIG. 11 shows a block diagram of a control system of the copying machine 100 and the flow of main data. The flow of the control data for controlling the timing of the entire image processor 100 and the like is omitted to be displayed. The thick solid line shows a flow for image data, the thin solid line shows a flow for the data on operation, and the dashed line shows a flow for additional data.

In the control system of the copying machine 100, an output section 2 forms an image to provide a hard copy. An image reader 3 reads a document to send digital image data thereof. An operation unit 4 sets and displays copying conditions by a user. An image decision section 5 analyzes the image data to extract additional data or to separate image data including only image information from additional data. An image recovery section 6 recovers the extracted additional data. An image memory 7 stores image data to be printed by the output unit 2. An editor 8 edits image data stored in the image memory 7. An additional image management section 9 analyses the additional data received from the image decision section 5. A secret management section 10 decides to prohibit or not image forming of hard copies according to the copy allowable time in the additional data. A main controller 1 for controlling an entire sequence of the system sends instructions to the image reader 3, operation unit 4, the image decision section 5, the image recovery section 6, the additional data management section 9 and the secret management section 10, while each section sent the instructions by the main controller 1 sends results of the instructions of the processing to the main controller 1. The main controller 1 also controls the output section 2 according to the results to generate hard copies. Details of these blocks in the system are explained below.

3-2 Image Reader

Figure 12:
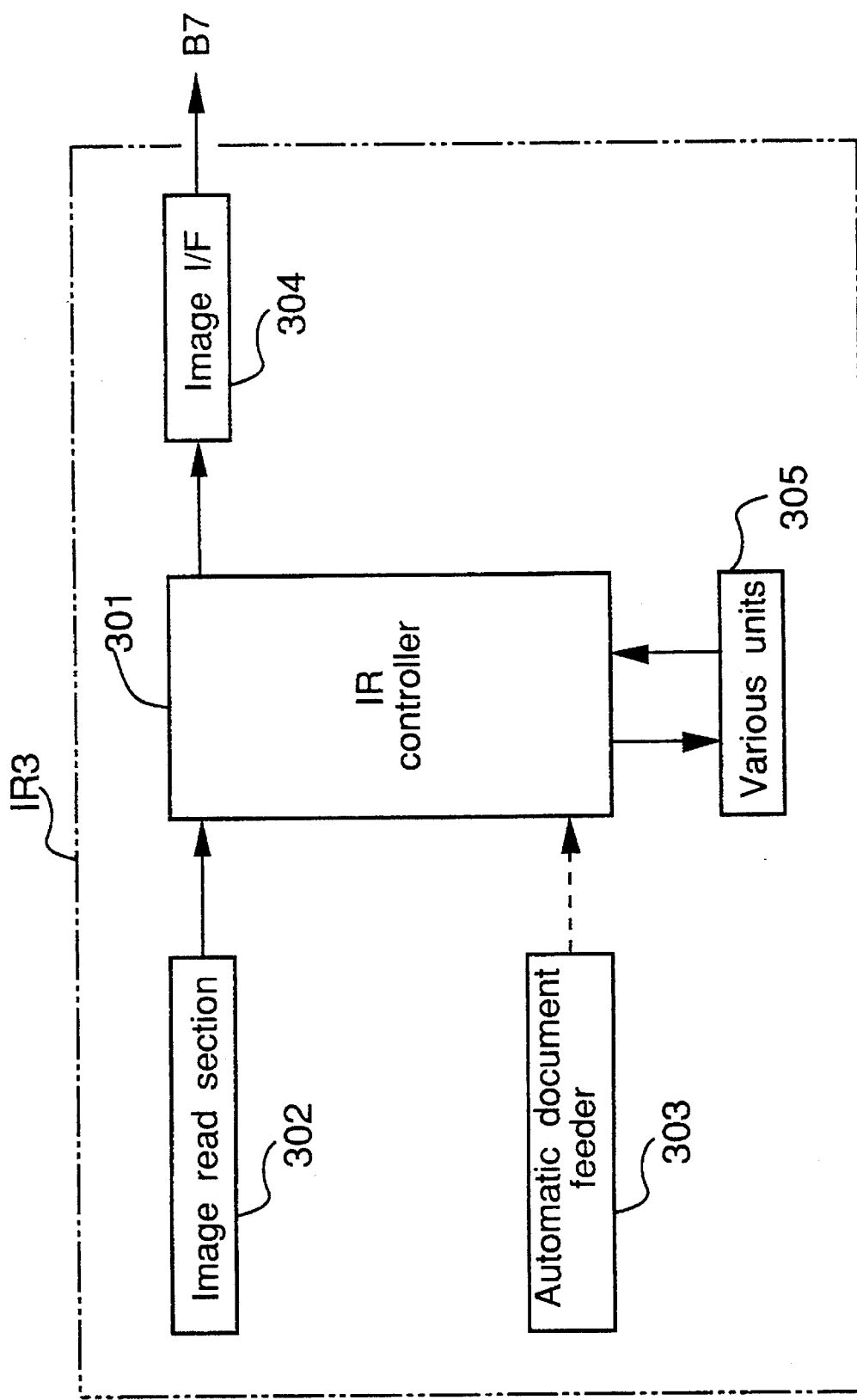
FIG. 12 is a block diagram of an image read section.

FIG. 12 shows a block diagram of the image reader 3. In the image reader 3, an automatic document feeder 303 discharges a document on a platen and feeds a new document on the platen automatically. An image read section 302 reads a document set on a platen manually or with the automatic document feeder 303 with a linear CCD sensor as a dot pattern and sends obtained image data to an image reader controller 301, which sends the image data via an image interface 304 to a bus B7. The image reader controller 301 including a CPU controls various units 305 such as a motor to moving the linear CCD sensor.

3-3 Image decision and recovery sections

The image decision section 5 analyses received image data and separates image data from block data embedded as additional data. Further, the image recovery section 6 recovers continuous additional data from the block data, and it also recovers the original image data of a document before adding the additional data. The image decision section 5 and the image recovery section 6 have a processor and a memory, and they are activated by the main controller 1.

The image decision section 5 can read additional data embedded in a document image as explained above, and the additional data is sent via the bus B6 to an additional data management section 9 explained later.

Figure 13:
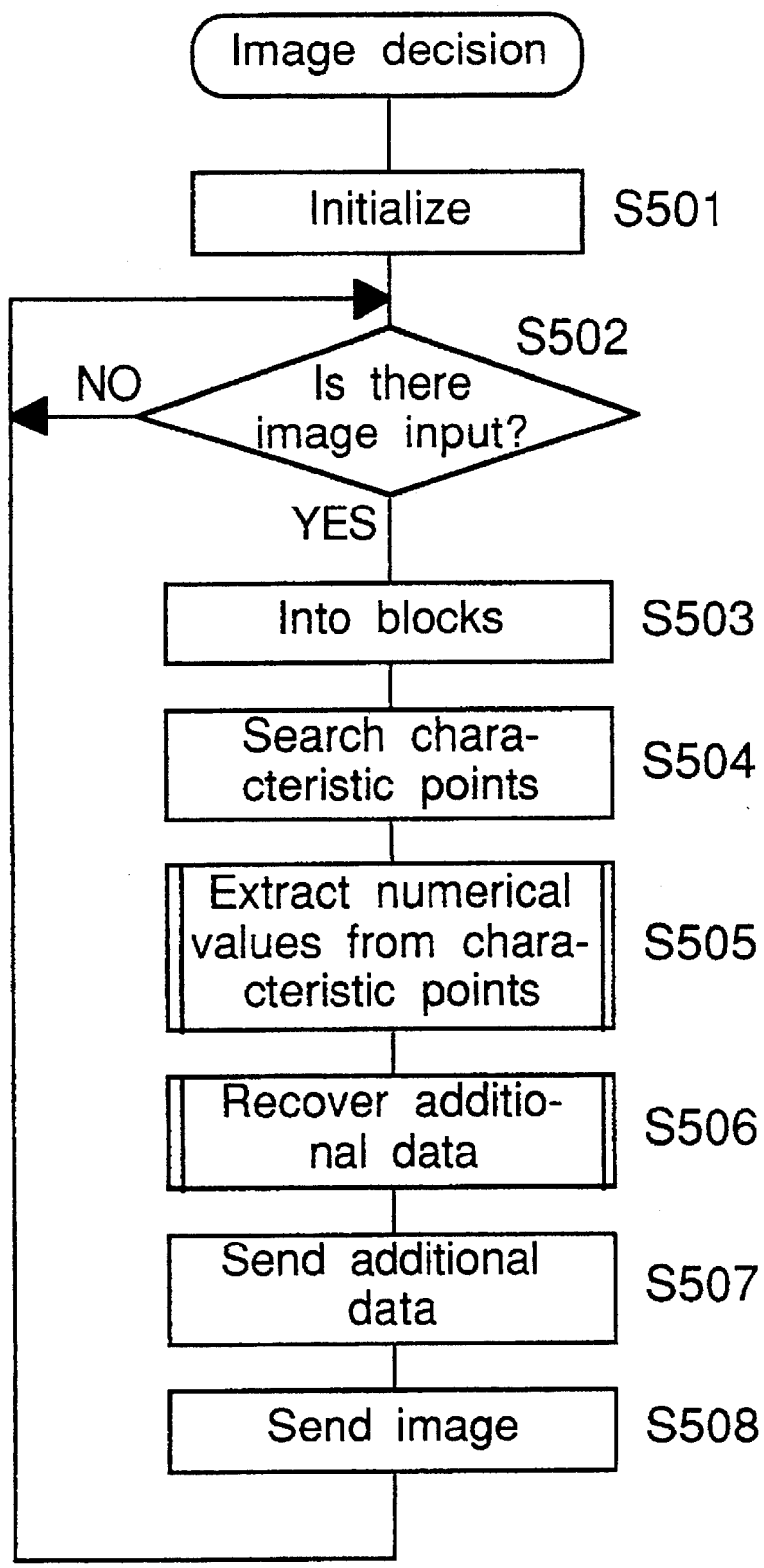
FIG. 13 is a flowchart of image decision.

FIG. 13 shows a flow performed by the image decision section 5. After the initialization (step S501), digital image data is received (YES at step S502). Then, the image data is divided into areas each for different density distribution in an image (step S503), and coordinates for characteristic points are searched (step S504). A characteristic point denotes a pixel having a predetermined density (refer FIG. 9B). Further, binary numbers are extracted from the characteristic points according to the predetermined position relation shown in FIG. 5 (step S505). The binary numbers extracted in the unit of blocks are rearranged in the order of block number according to a predetermined procedure and additional data is recovered (step S506). After the extraction of additional data from the characteristic points, the additional data is sent to a bus B6 (step S507), while the recovered digital image data is sent to a bus B4 (step S508). Then, the flow returns to step S502.

Figure 14:
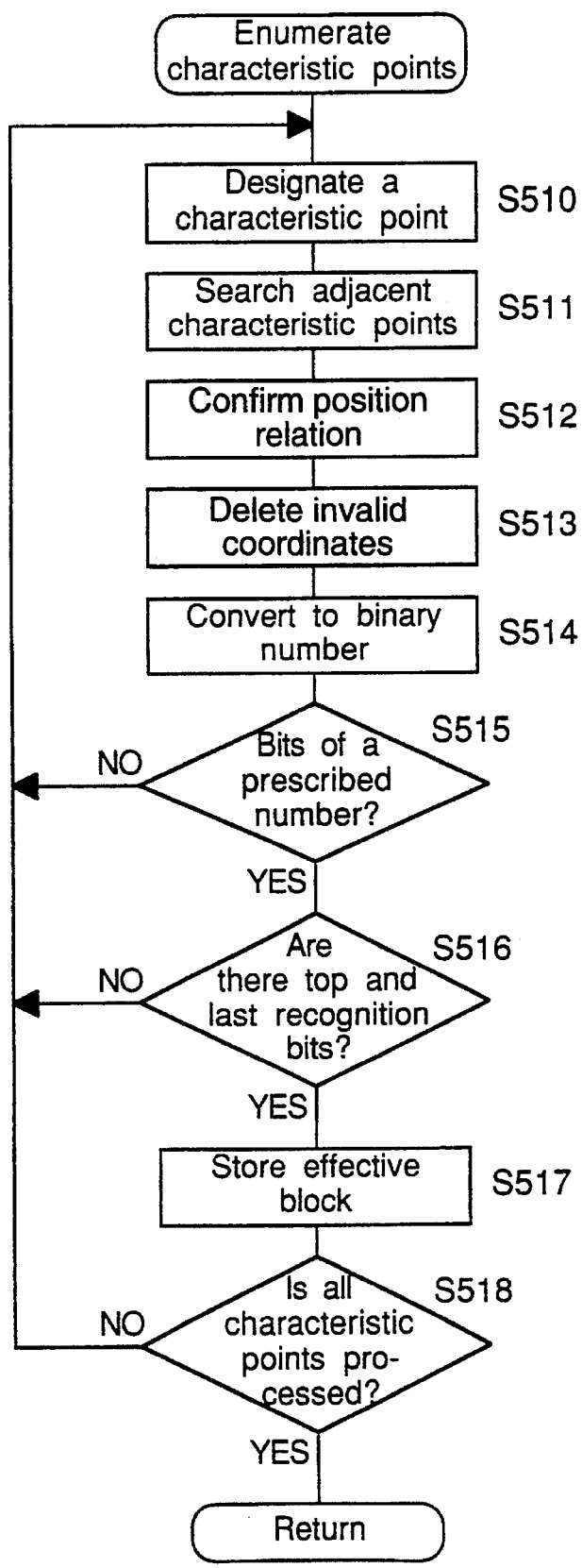
FIG. 14 is a flowchart for providing numerical data of characteristic points.

FIG. 14 shows a flow of the extraction of numerical values from characteristic points (step S505 in FIG. 13). The extraction is performed by judging a position relation of the characteristic points. In this embodiment, a block of additional data is embedded linearly within a predetermined range. The embedding may not necessarily be performed in a linear line and may be performed for example on an arc if the position relation is defined beforehand.

First, a characteristic point is searched or determined (step S510). Then, all the other characteristic 10 points existing within the predetermined range are searched (step S511). The maximum length of the predetermined range amounts to the length of a block (i.e. the pixel length times the pixel-to-pixel distance). Next, it is confirmed if the coordinates of the characteristic points have the predetermined position relation (a linear line in this example) (step S512), and invalid coordinates and data are deleted (step S513). Then, the coordinates of the valid data of a block are converted to a binary number (step S514). Next, if it is decided that the binary number has a prescribed number of bits (YES at step S515) and that the binary number includes top and last recognition bits (YES at step S516), the binary data is stored as valid data (step S517). The above-mentioned processing is repeated until all characteristic points are processed (YES at step S518).

Figure 15:
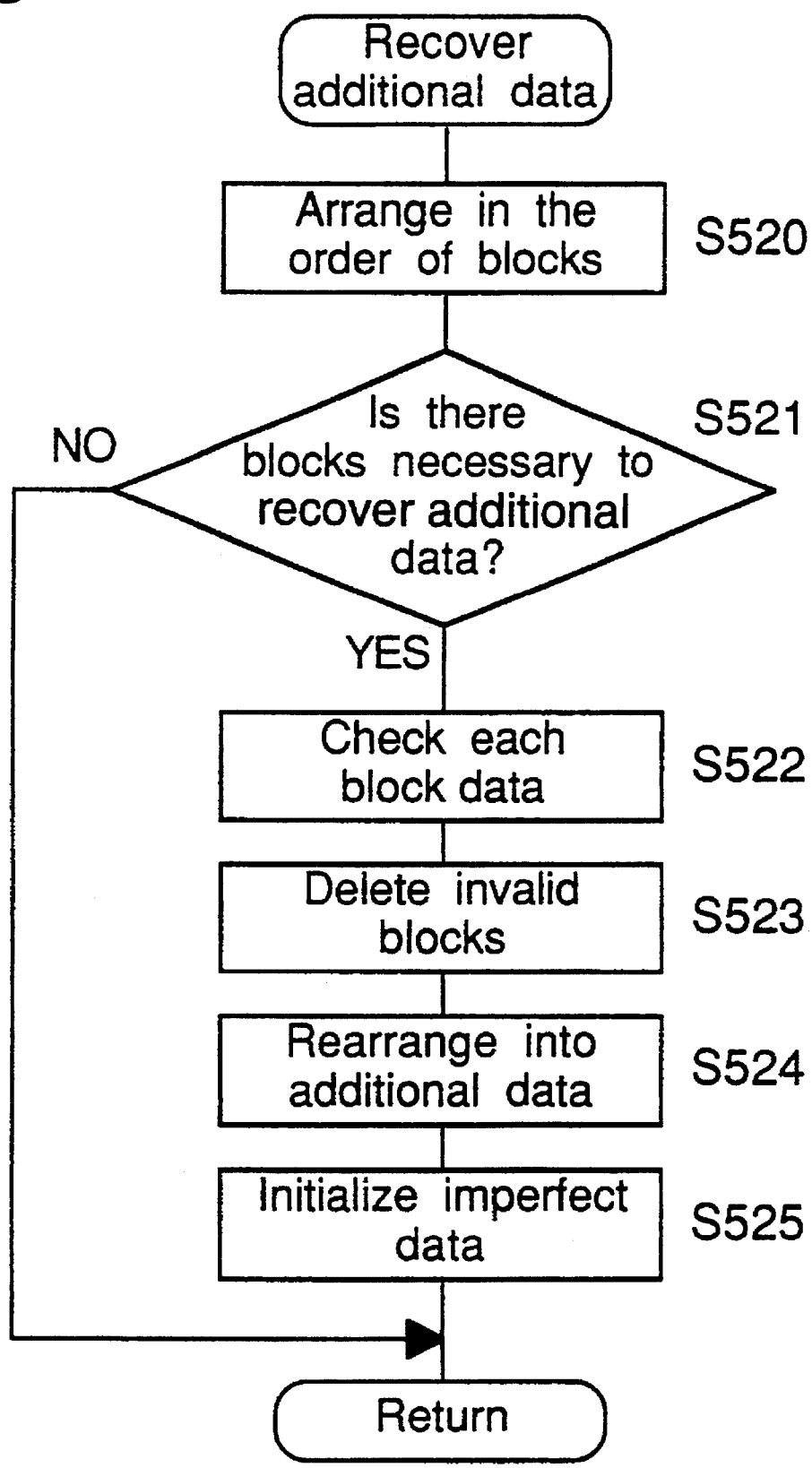
FIG. 15 is flowchart of the recovery of additional data.

In the image recovery step S506, the effective block data extracted as described above is recovered to additional data. FIG. 15 shows a flow of the recovery of additional data (step S506 in FIG. 13) wherein all the blocks decided to be valid obtained at step S505 are converted to binary data. First, the data of the valid blocks are arranged in a row in the order of block number included in the data (step S520). Then if it is decided that blocks enough at least to recover additional data are available (YES at S521), the data of each block is checked (step S522). In this embodiment, a plurality of sets of additional data is embedded in a hard copy, and it is verified if the data of the same block number are the same with each other. If the data of the same block number are not the same, the data of the majority is adopted. If the data of the blocks cannot be determined by the majority decision, the data of the invalid blocks are deleted (step S523) and the data of the valid blocks are rearranged to recover additional data (step S524). Further, imperfect data having defects are initialized with predetermined values such as zeros or spaces (step S525).

The image recovery section 6 receives image data from the image decision section 5 and recovers image data before adding additional data. After the additional data has been extracted from the image data by the image decision section, it is received by the image recovery section 6. The image recovery section 6 recovers image data before adding the additional data. In the image recovery, data on a characteristic point is replaced with a density around the characteristic point.

3-4 Operation unit

The operation unit 4 is used to set and display copying conditions and a copy instruction. It also manages a current time.

Figure 16:
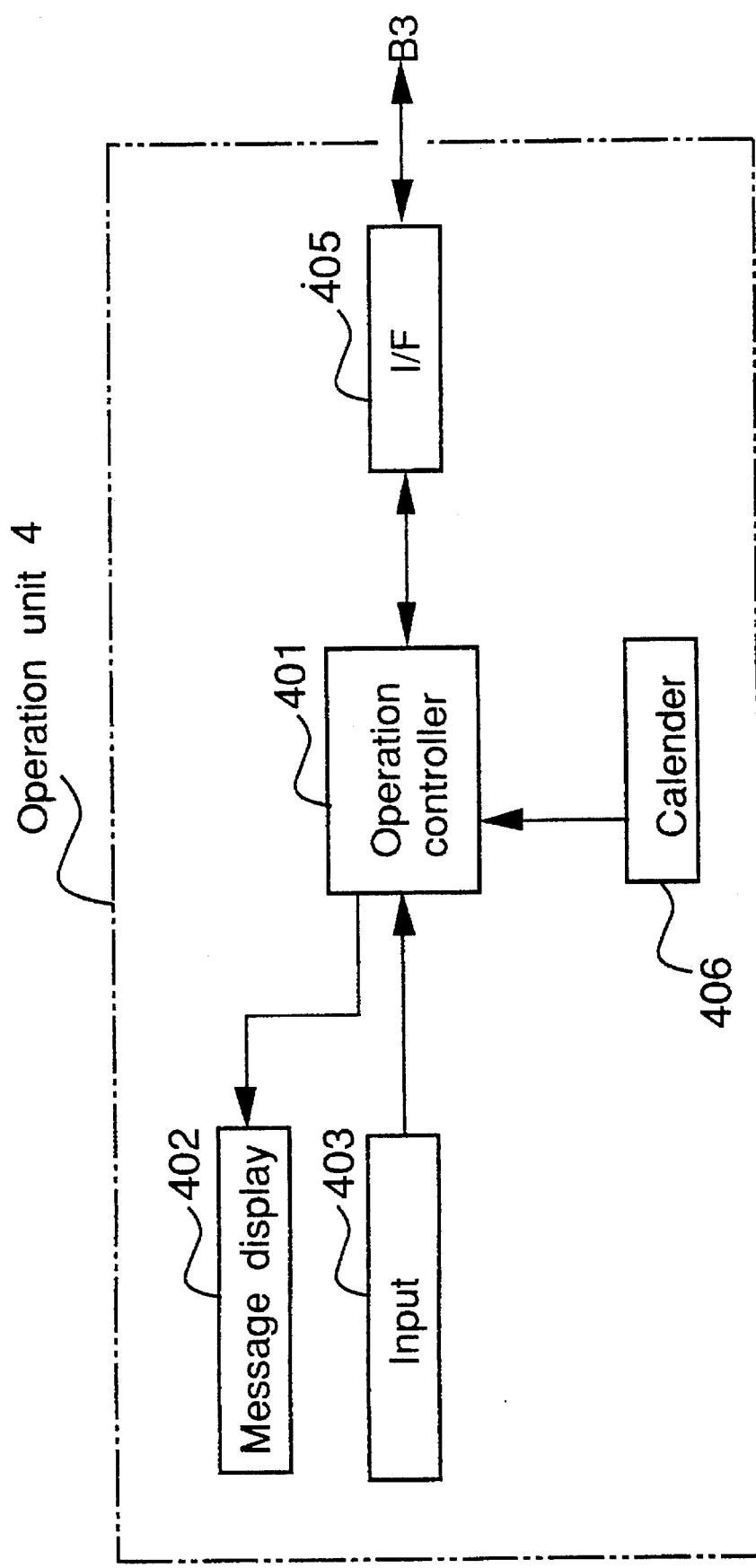
FIG. 16 is a block diagram of an operation section.

FIG. 16 shows a block diagram of the operation unit 4. An operation controller 401 including a CPU controls the operation unit 4. A message display 402 has a liquid crystal display and displays copying conditions. An input section 403 has an operational panel with ten-keys and other keys such as a copy button, and a user may operate the keys to set copying conditions performed by the output unit 6 for producing a hard copy. It is also used to set instructions for various blocks such as the output section 2 or the editor 8 in the system. An interface 405 connects the operation unit 4 to a bus B3. For example, a copy start instruction is sent to the main controller 1, copying conditions are sent to the output section 2, and instructions for editing an image are sent to the editor 8. The editor 8 accesses the image memory 7 and edits the image. A calendar generator 406 generates a current time (year, month, day and time) and it is used to provide a current time. The current time is sent to the secret management section 10 when requested.

As will be explained later, the additional data management section 9 updates many additional data automatically when a hard copy is generated. However, a part of additional data such as the user ID number and the copy allowable time may be changed by a user by using the input section 403. The new additional data is sent to the additional data management section 9. It is possible to set up the operation unit 4 so that a user is allowed to change the additional data only when the user sets a registered IC card in the operation unit 4.

If a user wants to display an additional message, it is displayed by the message display device 402. In this case, when a read of additional data is instructed with the input section 403, the instruction is sent to the additional data management section 9, which sends the additional data in return to the operation unit 4. Then, the operation unit 4 displays the additional data. However, it is needed to prohibit that the copy allowable time is abused. Then, as to the copy allowable time, it is only displayed when a user sets a password and the secret management section 10 decides that the password is legitimate.

3-5 Additional data management section

The additional data management section 9 collects and manages additional data received from the image decision section 5 and the operation unit 4. The additional data may be used to generate new additional data for each hard copy according to an instruction from the main controller 1, so that the generated additional data is embedded in a hard copy.

Figure 17:
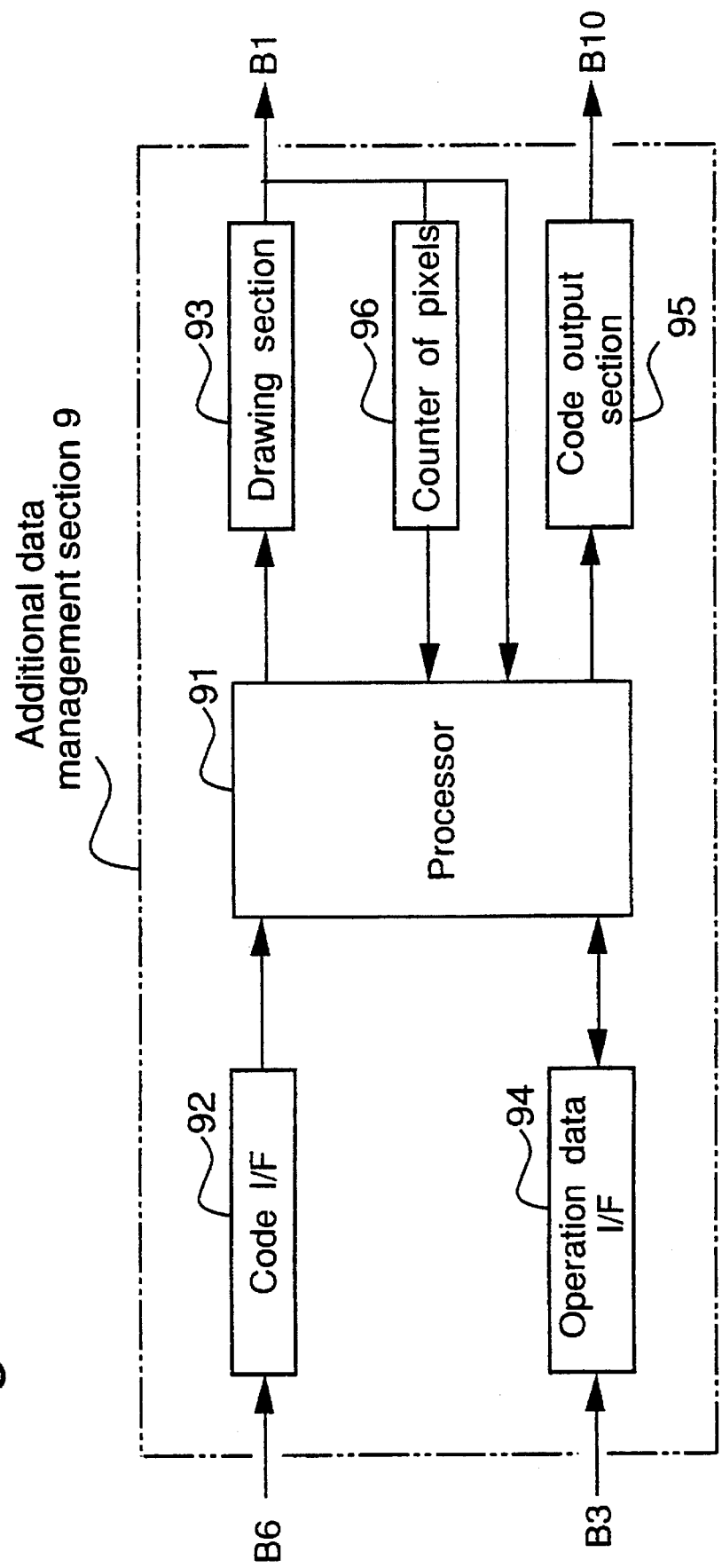
FIG. 17 is a block diagram of an additional data management section.

FIG. 17 shows a structure of the additional data management section 9. A management processor 91 including a CPU receives code data through a code interface 92 and operation data via an operation data interface 94, and it is controlled by the main controller 1. For example, the processor 91 makes a drawing section 93 embed additional data in an image stored in the image memory 7. The processor 91 can access directly the image memory 7 via the bus B1 when additional data of blocks designated by the operation unit 4 are searched by using an area not used in the image memory 7 as a working area. A counter 96 counts the number of pixels in an area of a pattern or measures the area. An image comprises density data of a prescribed resolution, and the area is determined for simplicity by counting the number of pixels having a density larger than a prescribed density. In order to improve the precision of the management, a plurality of areas of various predetermined density bands may be counted.

When additional data is received through the code interface 92, the processor 91 classifies the additional data into source information, copy conditions, user information and intrinsic information, as shown in Table 2.

TABLE 2

Data received from various sources

| | |
|---|---|
| source information | document name |
| | book code |
| | page number |
| | generation number* |
| | copy allowable time |
| | total pixel number* |
| | copy succession number* |
| copy conditions | copy number |
| user information | user ID number |
| intrinsic information | copy time |
| | machine recognition number |

NB. Data with a mark * are updated for each copy

A user can search the additional data by instructing search with the operation unit 4, and can display the result in the message display 402. When a search instruction is received from the operation unit 4, the processor 91 searches the additional data and sends it to the operation unit 4.

When a user instructs the generation of a hard copy, the processor 91 receives the instruction from the main controller 1 and reads the copy allowable time in the additional data included in the hard copy. Then, it sends the copy allowable time to the secret management section 10 through the code output section 95. That is, data on the copy allowable time is extracted from a document image to be copied by using the image reader 3, the image decision section 5 and the additional data management section 9, and it is sent to the secret management section 10. When the secret management section 10 permits the generation of a hard copy, the processor 91 receives an instruction from the main controller 1 and updates some data in the additional data in order to embed the additional data in a hard copy, as explained below.

Next, it is explained how to update or generate new additional data. A document name can be added by a user with the operation unit 4 for an original document or generated from the date and the user name, while a book code and a page number are already stored in a document. These data are fixed, and the same data is transferred on copying.

A generation code is added by the copying machine 100 automatically on printing a hard copy. When a hard copy is produced newly or on a document without additional data, the generation is set to be one. In this case, a document name and the like may be entered by a user with the operation unit 4 or it may be generated automatically from the time or the user ID number. The generation code is increased for each copying of a new generation. When regeneration from a hard copy is performed, the generation code is changed to a generation code next to that embedded in the hard copy.

A copy code is generated successively by the copying machine. It is not related to the additional data included in a document.

A copy allowable time is not changed if it is included in a document. Otherwise or if necessary, it can be set by the operation unit 4.

A total pixel number is counted when the edition of an output image is completed. The pixels for the additional data included in a document are not counted.

A copy date when a hard copy is produced is set by using the calendar 406 provided in the operation unit 4.

A user ID number is different for each hard copy, and it is read from an IC card which is set by a user in the operation unit 4.

A machine recognition code is intrinsic for a copying machine or a printer and it is registered beforehand in the additional data management section 9. A hard copy produced with the same machine has the same machine recognition code.

The processor 91 embeds the updated additional data in the image memory 7 with the drawing section 93 and the counter 96 for pixel number. The counter 96 is used to count an area of an image pattern stored in the image memory 7. Though an image is generally composed of density data of a prescribed resolution, it is assumed here for simplicity that pixels having a predetermined density or more are included in the image pattern. In order to improve precision of management, a plurality of areas of prescribed different density bands may be managed.

Figure 18:
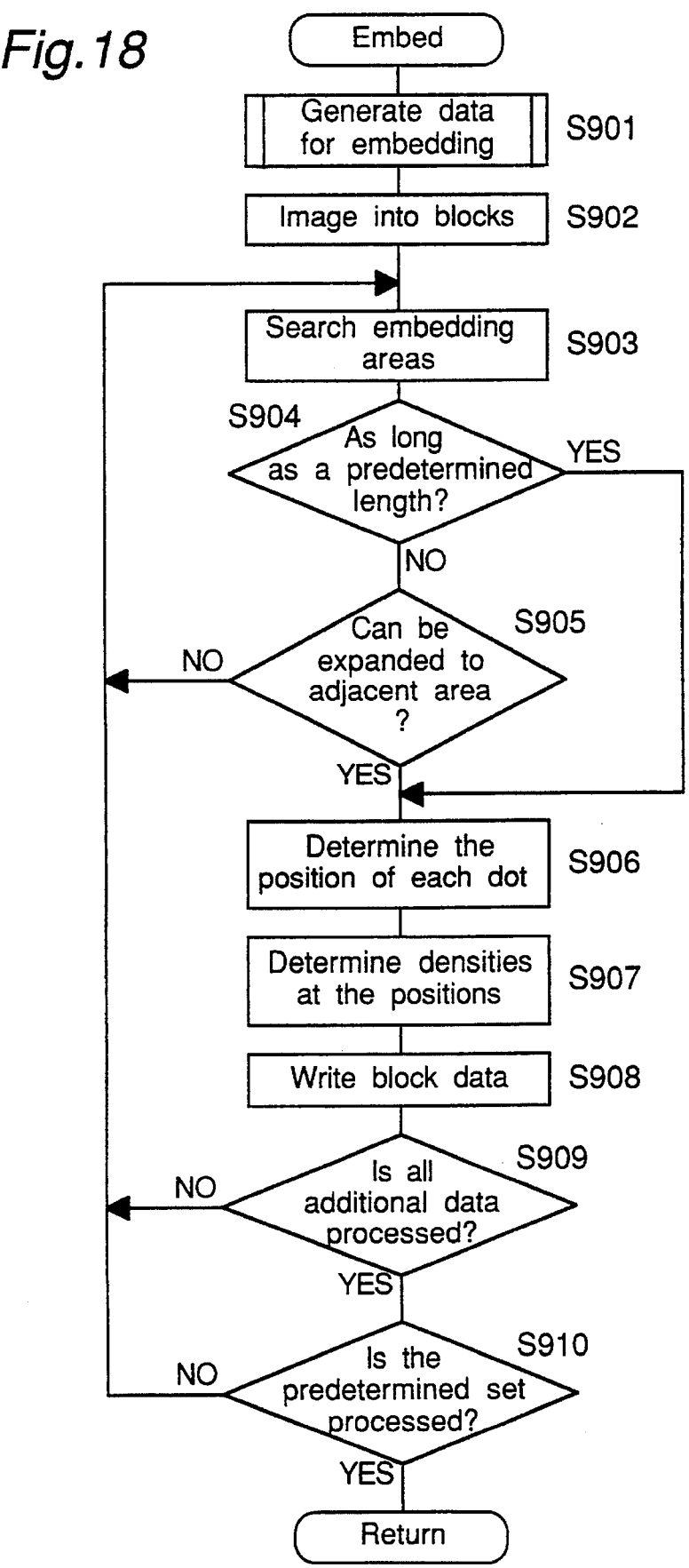
FIG. 18 is a flowchart of an additional data management section.

FIG. 18 shows a flow of embedding additional data carried out by the processor 91 in the additional management section 9. First, block data of a binary number are generated by dividing additional data into blocks of a predetermined dot number (step S901). Next, in order to embed each block data in a hard copy as shown in FIGS. 5 and 6, the values of the block data are converted into signals of density data (step S902). Then, areas for embedding the block data in a hard copy are searched (step S903). Then, if an area as long as a predetermined length is decided to exist (YES at step S904) or if an area is decided not so long as the predetermined length but extensible to an adjacent area because the density changes gradually (YES at step S905), the positions of each block data are determined (step S906), and the density values in a density block appropriate for the positions are determined (step S907). Next, the block data determined above are written in the image data (step S908). The above-mentioned processing is repeated until all additional data is processed (YES at step S909). Further, the above-mentioned processing is repeated until a predetermined number of sets are embedded (YES at step S910).

Figure 19:
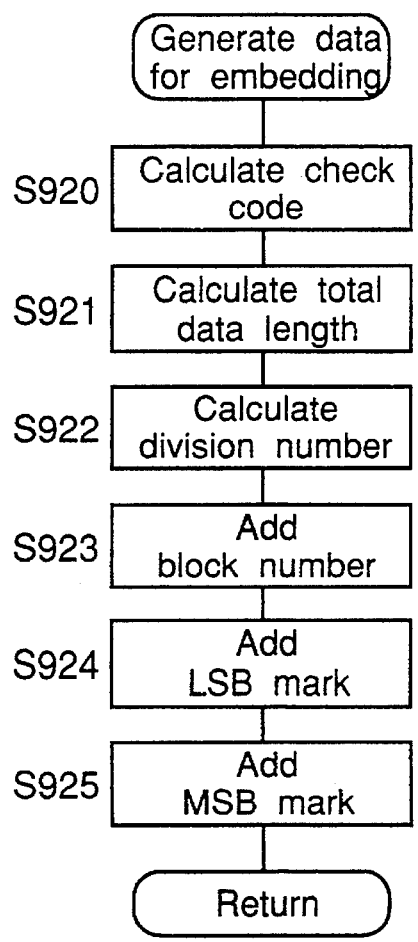
FIG. 19 is a flowchart of the embedding a new additional data in the additional data management section.

FIG. 19 shows a flow of the generation of data to be embedded (step S901 in FIG. 18). First, check codes for making it possible to recover embedded block data and error correction codes are calculated (step S920), and the total data length of additional data illustrated in FIG. 2 is calculated (step S921). Further, the bit number for dividing the additional data into blocks is calculated and the number of blocks is calculated (step S922). Further, a block number is added to each block data obtained by dividing the additional data (step S923), and the mark LSB for designating the start of the block data and the mark MSB for designating the end of the block data are added (steps S924 and S925). Thus, block data as shown in FIG. 4 can be generated. Therefore, because additional data is updated and is embedded as described above, the leakage path can be analyzed easily by referring the user ID number, copy date, copy number and the like.

3-6 Secret management section

The secret management section 10 detects a secret document and allows or prohibits copying thereof. The secret management section 10 has a CPU for controlling the entire secret management section 10. When the secret management section 10 receives a copy allowable time from the additional data management section 9, it requests the operation unit 4 to send a current time. When it receives the current time from the operation unit 4, it compares it with the copy allowable time to determine to permit copying or not. The determination is sent to the main controller 1.

Figure 20:
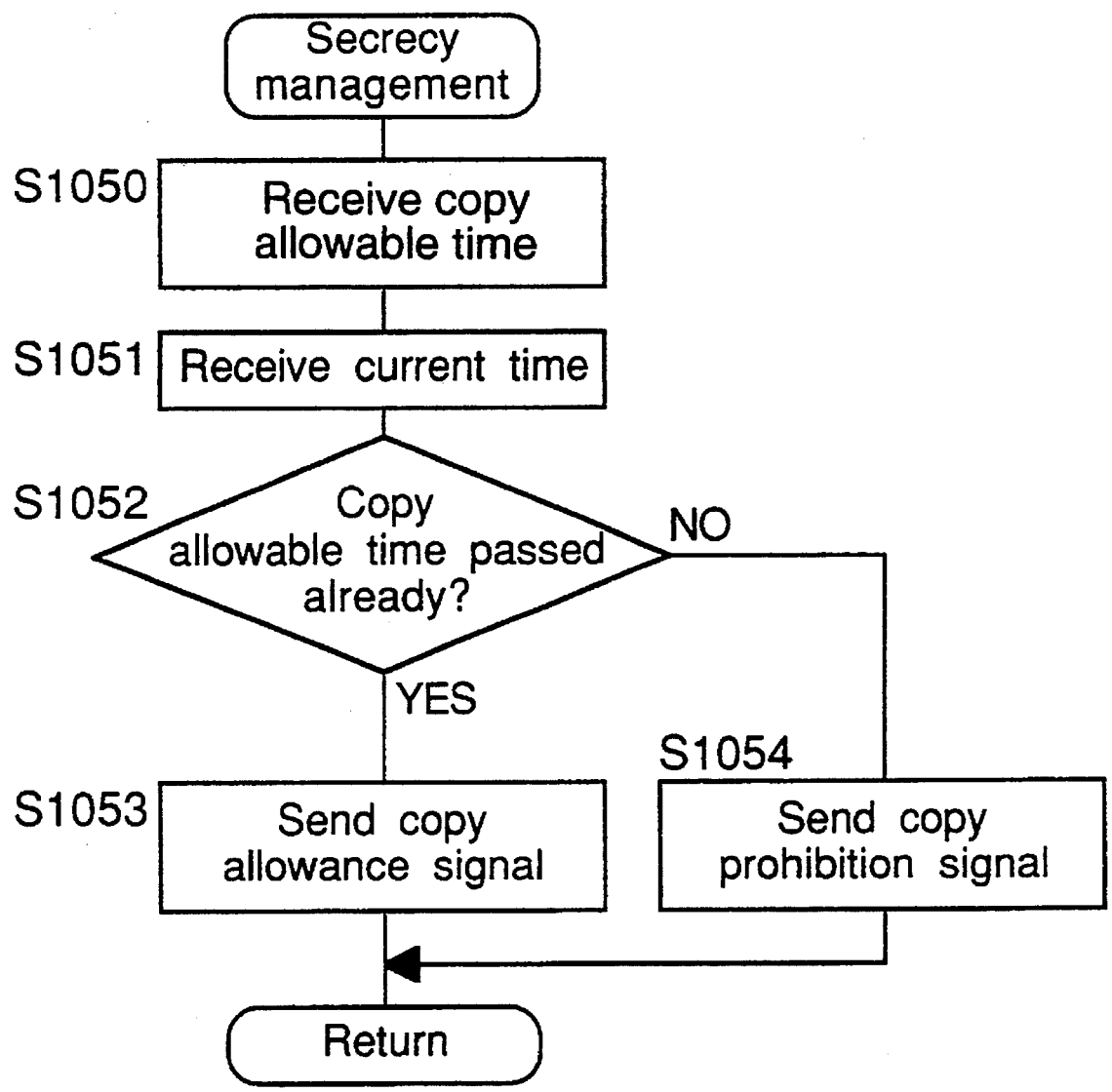
FIG. 20 is a flowchart of secret management of a secret management section.

FIG. 20 shows a flow of the secret management by the secret management section 10. First, a copy allowable time in additional data is received from the additional data management section 9 (step S1050). Next, a current time is read from the operation unit 4 (step S1051), and it is compared with the copy allowable time (step S1052) in order to check if the copy allowable time has passed already. If the copy allowable time is decided to pass already (YES at step S1052), a copy allowance signal is sent to the main controller 1 (step S1053), otherwise a copy prohibition signal is sent to the main controller 1 (step S1054).

When a copy allowable time is instructed to display, the secret management section 10 checks a password provided by a user with the operation unit 4. If the password is decided to be legitimate, the copy allowable time is allowed to be displayed, otherwise prohibited. Thus, illegal leakage of secret documents can be prevented.

3-7 Main controller

Figure 21:
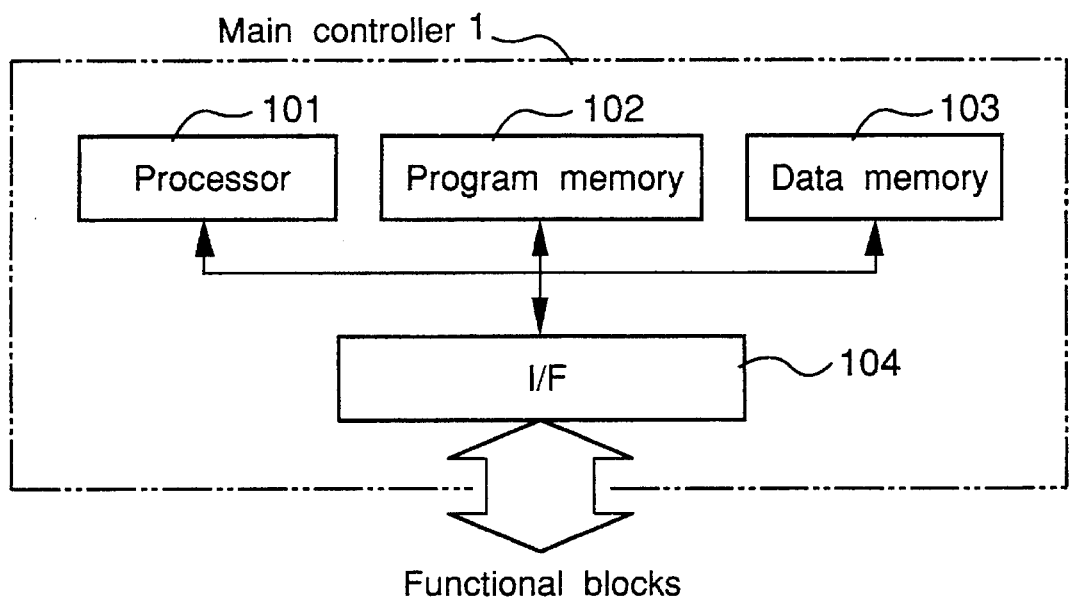
FIG. 21 is a block diagram of a main controller.

FIG. 21 shows a structure of the main controller 1 which carries out the receive of image data from the image reader 3, the start of the image reader 3 or the like, and the sequence control of the hard copy processing. The main controller 1 consists of a processor 101 including a CPU, a program memory 102 storing a program run by the processor 101, a data memory 103, and an interface 104 with each function block in the copying machine 100.

Figure 22:
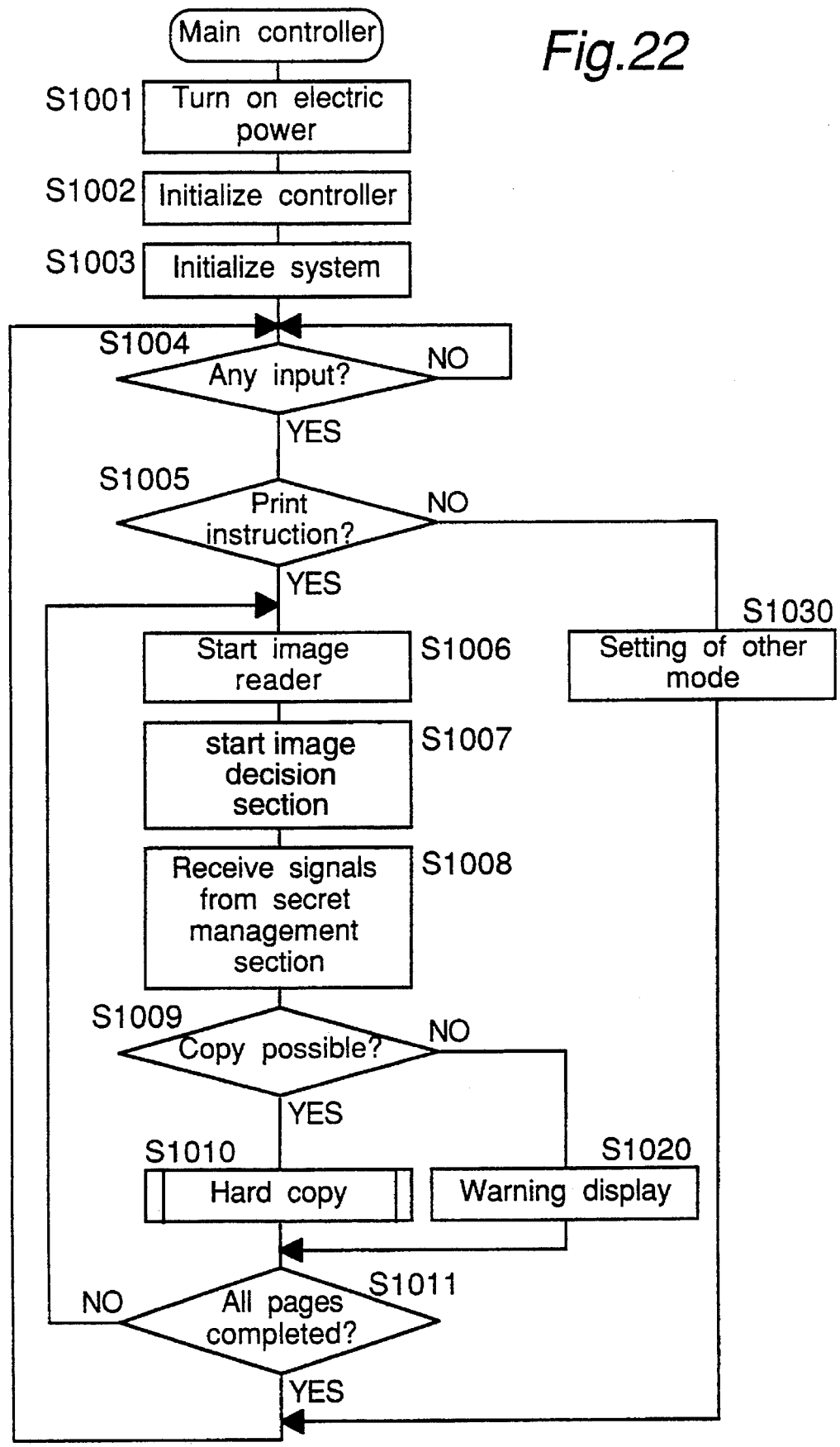
FIG. 22 is a flowchart of the processing of the main controller.

FIG. 22 shows a flow of the processor 101 wherein processings which are not related directly to the present embodiment are omitted. In the flow, it is noted that before a hard copy is generated, a copy allowable time is extracted from a document and copying operation is controlled according to the comparison of the copy allowable time with a current time.

After the main controller 1 is turned on (step S1001), the processor 101 is initialized (step S1002) and the image forming system for hard copy is initialized (step S1003). Then, an instruction is waited to be received from the operation unit 4 (step S1004). When data is received (YES at step S1004), it is checked if the input data is a print instruction (step S1005). If print is not decided to be requested with the operation unit 4 (NO at step S1005), the flow goes to step S1030 for processing other modes. For example, copying condition are set in this step. Then, the flow returns again to step S1004.

If print is decided to be requested with the operation unit 4 (YES at step S1005), the image reader 3 is activated (step S1006). Then, as explained above, the image reader 3 reads a document on the platen glass. Then, the image decision section 5 and the image recovery section 6 are activated (step S1007). Then, as explained above, the image decision section 5 checks the block data of additional data embedded in a hard copy and recovers the additional data. Then, the image decision section 5 sends the additional data to the additional data management section 9. The image data recovered by the image recovery section 6 are stored in the image memory 7. Further, the additional data management section 9 manages extracted additional data. When the processing of the image decision section 5 and the image recovery section 6 is completed, the secret management section 10 is activated, and a copy allowance signal is received from the secret management section 10 (step S1008). If the document is decided not to be a secret document or if prescribed data including a password is inputted for a secret document, a copy allowance signal is received (YES at step S1009). Then, an instruction of hard copy is sent to the output section 2 (step S1010). If copying is not allowed, a warning is displayed in the operation unit 4 (step S1020). If a plurality of documents are set in the automatic document feeder 303, the flow returns to step S1004 and the above-mentioned processing is repeated until all pages are processed (YES at step S1011).

At step S1020, a warning is displayed and copying is not performed. In a modified example, instead of prohibiting generation of hard copy, the document may generate a hard copy which is very different from the document so as to make it difficult to recognize an image. This helps to keep the document secret. For example, the magnification power may be changed to an extremely small value, the density in a hard copy may be reduced to a very light color, or colors in a hard copy may be changed.

Figure 23:
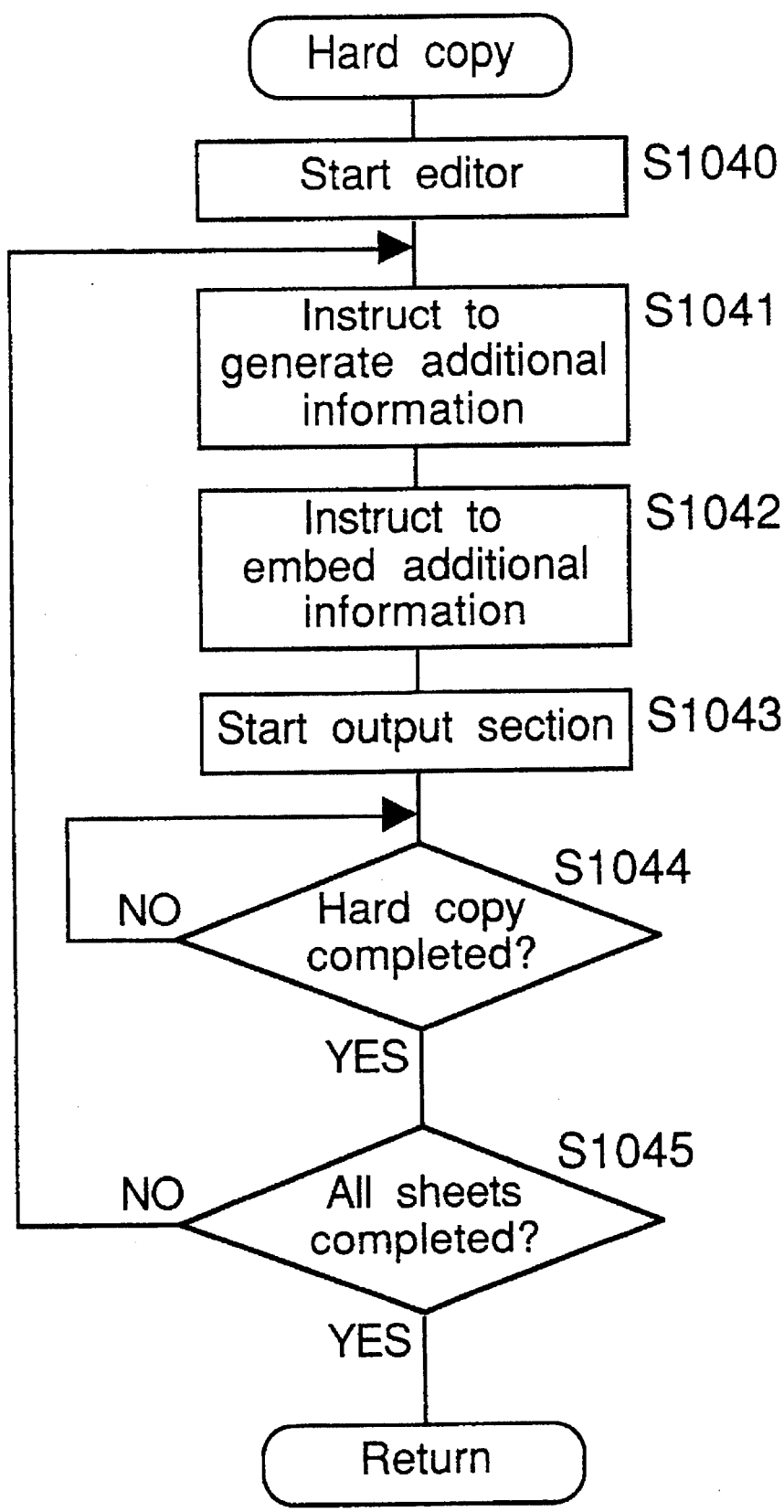
FIG. 23 is a flowchart of hard copy processing.

FIG. 23 shows a flow of hard copy processing (steps S1010 in FIG. 22) to produce a hard copy. First, the editor 8 is activated to edit the document image if the edition is instructed with the instruction unit 4 (step S1040). Next, generation of new additional data is instructed to the additional data management unit 9 (step S1041), and sends the additional data to the management unit 9 (step S1041). Then, 10 the additional data is instructed to be embedded in the image data by the additional data management section 9 (step S1042). Next, the output unit 2 is started (step S1043). Thus, the image data is read from the image memory 7 synchronously with the output unit 2 for printing. After the completion of the hard copy with an electrophotography process (YES at step S1044), if it is decided that hard copies of the predetermined total number of sheets is not completed (NO at step S1045), the flow returns to step S1041.

It is to be noted that various control can be possible by using time data included in additional data. For example, copying is allowed when a copy allowable time in an additional time passes a current time in the embodiment. On the other hand, copying may be prohibited when a prescribed time in an additional time passes a current time. It is also possible to allow or prohibit copying in a predetermined period in an additional time.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controller for an image forming apparatus comprising:

a memory for storing digital image data of a document;

an image recognition device which recognizes time data included in the digital image data;

a clock which provides a current time; and a comparator which compares the time derived from the time data recognized by the image recognition device with the current time provided by said clock and supplies a signal to control the image forming apparatus according to a result of the comparison.

2. The controller according to claim 1, wherein the time data recognized by said image recognition device is a copy allowable time.

3. The controller according to claim 1, wherein the time data recognized by said image recognition device is a period when illegitimate generation of the document is prohibited.

4. The controller according to claim 1, wherein the signal supplied by said comparator represents allowance or prohibition of an image forming operation of the image forming apparatus according to the result of the comparison.

5. The controller according to claim 1, wherein the signal supplied by said comparator represents a normal image forming operation of the image forming apparatus or an image forming operation which forms an image not recognized with naked eyes according to the result of the comparison.

6. The controller according to claim 1, wherein said image recognition device recognizes time data embedded in the image data in the memory.

7. The controller according to claim 1, wherein said image recognition device recognizes time data formed in an area except the image of the document.

8. An image forming apparatus comprising:

an image reader which reads an image of a document and provides digital image data thereof;

a memory for storing the digital image data of the document read by said image reader;

an image recognition device which recognizes time data included in the digital image data;

a clock which provides a current time;

an image forming device for forming an image on a paper according to an electrophotography process; and a comparator which compares the time derived from the time data recognized by said image recognition device with the current time provided by said clock and supplies a signal to control said image forming device according to a result of the comparison.

9. The image forming apparatus according to claim 8, wherein the signal supplied by said comparator represents allowance or prohibition of an image forming operation of the image forming device according to the result of the comparison.

10. The image forming apparatus according to claim 8, further comprising an operation unit for setting the time data included in the image data by a user.

11. The image forming apparatus according to claim 10, further comprising an editor for editing the digital image data stored in said memory so as to include the time data set with said operation unit.

* * * * *